United States Patent [19]

Meeker

[11] Patent Number: 5,759,927

[45] Date of Patent: Jun. 2, 1998

[54] GLASS-FIBER-CONTAINING NON-WOVEN POLYMER WEB, AND PROCESS FOR PREPARING SAME

[76] Inventor: Brian L. Meeker, 738 Kumlar Dr., Maumee, Ohio 43537

[21] Appl. No.: 506,421

[22] Filed: Jul. 24, 1995

[51] Int. Cl.⁶ .................. B32B 5/26; B32B 7/10; B32B 31/06; B32B 31/20
[52] U.S. Cl. .................. 442/334; 156/62.2; 156/309.6; 264/331.11; 264/331.13; 264/331.17; 264/331.19; 442/390; 442/411; 428/332; 428/339
[58] Field of Search .................. 428/302, 332, 428/339; 156/62.2, 309.6; 442/334, 390, 411

[56] References Cited

U.S. PATENT DOCUMENTS

| | | |
|---|---|---|
| 3,158,668 | 11/1964 | Johnson . |
| 4,318,774 | 3/1982 | Hayle et al. . |
| 4,596,736 | 6/1986 | Eichhorn et al. . |
| 4,810,445 | 3/1989 | Lamb, Sr. et al. . |
| 4,989,538 | 2/1991 | Tamura et al. . |
| 5,108,678 | 4/1992 | Hirasaka et al. . |
| 5,198,063 | 3/1993 | Howard et al. . |
| 5,362,546 | 11/1994 | Boulanger .................. 442/390 |

*Primary Examiner*—James C. Cannon
*Attorney, Agent, or Firm*—Donald R. Fraser

[57] ABSTRACT

A glass-fiber-containing nonwoven polymer web is prepared by providing a nonwoven polymer web, applying a layer of glass fibers onto the nonwoven polymer web, and encapsulating the glass fibers into the nonwoven polymer web utilizing heat and pressure. Alternatively, a glass-fiber-containing polymer web is prepared by providing a first nonwoven polymer web, applying a layer of glass fibers onto the first nonwoven polymer web, superposing over the layer of glass fibers a second nonwoven polymer web, and laminating together the assemblage to encapsulate the glass fibers.

17 Claims, 1 Drawing Sheet

GLASS-FIBER-CONTAINING NON-WOVEN POLYMER WEB, AND PROCESS FOR PREPARING SAME

FIELD OF THE INVENTION

This invention relates generally to a glass-fiber-containing nonwoven polymer web, and a process for preparing same. More particularly, the invention is directed to a single or multiple layered nonwoven polymer web having glass fibers encapsulated therein, and to a process for preparing same.

BACKGROUND OF THE INVENTION

It is well-known to employ glass fibers into composite articles to strengthen and reinforce same. Glass fibers are most generally placed into a plastic or polymer matrix where the high tensile strength glass fibers cause the deformable or elastic matrix to become more rigid.

Glass fibers are often used to stabilize laminar structures. For example, a resin-impregnated glass fiber mat is often used to stiffen composite layers of a molded automotive vehicle headliner, so that it will not sag due to the effect of gravity over the life of the vehicle. Glass fibers can also be added to laminar structures by sprinkling chopped fibers onto one of the laminae, then placing the next layer thereover and laminating the assemblage together. Often it is desirable to use a glass-fiber-containing sheet material which is highly pliable, so that it may easily be conformed to a highly irregular surface during a molding operation.

U.S. Pat. No. 4,989,538 to Tamura et al. discloses apparatus for sprinkling a glass fiber/resin composition, and a sheet material produced by said apparatus. A liquid resin composition is mixed uniformly with glass fibers and sprinkled onto a polyethylene film. A second film of polyethylene is superposed over the resin and glass fiber mixture, and the assemblage is pressed and partially cured, to form a SMC or EMC sheet.

It would be desirable to prepare a pliable, nonwoven polymer sheet material having glass fibers encapsulated therein, for use in preparing laminar composite molded articles which require the dimensional stability and stiffness afforded by such fibers, for use a process which requires that the sheet material be conformed to an irregular surface.

SUMMARY OF THE INVENTION

Accordant with the present invention, there surprisingly has been discovered a process for preparing a glass fiber containing polymer sheet. The process comprises:

providing a nonwoven polymer web;

applying a layer of uniformly distributed, randomly oriented glass fibers onto the nonwoven polymer web; and encapsulating the glass fibers, by heating said glass fibers and nonwoven polymer web to a temperature above the plastic set temperature of said nonwoven polymer web, and by compressing said glass fibers and nonwoven polymer web, said nonwoven polymer web at least partially melting and flowing around at least a portion of the filaments of said glass fibers and adhering thereto.

Alternatively, the process comprises:

providing a first nonwoven polymer web;

applying a layer of uniformly distributed, randomly oriented glass fibers onto the first nonwoven polymer web;

superposing over the layer of glass fibers a second nonwoven polymer web;

encapsulating the glass fibers, by heating the first nonwoven polymer web, glass fibers, and second nonwoven polymer web to a temperature above the plastic set temperatures of the first and second nonwoven polymer webs, and by compressing the first nonwoven polymer web, glass fibers, and second nonwoven polymer web, said first and second nonwoven polymer webs at least partially fusing together and at least partially encapsulating said glass fibers therebetween.

The invention further includes glass-fiber-containing nonwoven polymer webs prepared by the inventive processes.

The process and glass-fiber-containing nonwoven polymer web of the present invention is particularly useful for manufacturing molded automotive vehicle headliners and other relatively rigid decorative panels.

Further objects and advantages of this invention will be apparent from the following description and appended claims, reference being made to the accompanying drawings forming a part of the specification, wherein like reference characters designate corresponding parts in the several views.

DESCRIPTION OF THE PREFERRED EMBODIMENT

Figure 1:
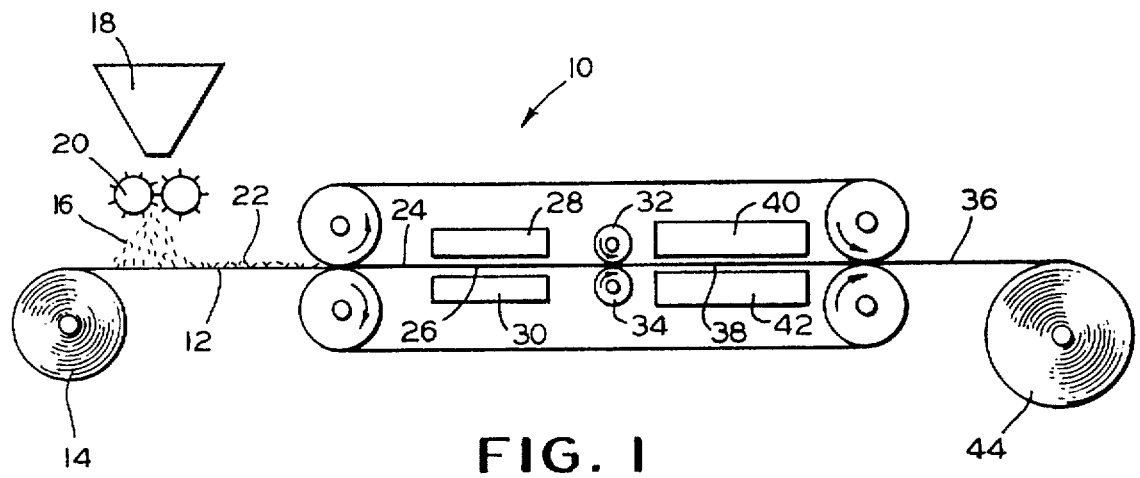
FIG. 1 is a schematic representation of a process for preparing a glass-fiber-containing nonwoven polymer web, embodying the features of the present invention.

Referring now to FIG. 1, there is shown generally at 10 a schematic representation of a process for preparing a glass-fiber-containing nonwoven polymer web. A nonwoven polymer web 12 is provided from a nonwoven polymer web supply roll 14, in a horizontal plane. Glass fibers 16 from a feed hopper 18 are applied at a controlled rate to a surface of the nonwoven polymer web 12 using a flow and distribution device 20 such as a star value. Alternatively, the glass fibers 16 could be applied by feeding continuous strands of glass to a chopper which discharges to the surface of the nonwoven polymer web 12. The flow distribution device is operating so as to cause a layer 22 of glass fibers, having a uniform, randomly oriented distribution, to be deposited onto the nonwoven polymer web 12.

The glass fibers 16 are encapsulated by the nonwoven polymer web 12, using heat and pressure. A preferred method of encapsulating the layer 22 of glass fibers 16 utilizes a belt press. The assemblage of the nonwoven polymer web 12 having the layer 22 of glass fibers 16 thereon is passed into an initial compression zone 24 of the belt press thence to a heating zone 26 where the assemblage is heated by conventional means such as, for example, by radiant heating elements 28 and 30 positioned above and below the belts of the press. The assemblage is heated to a temperature above the plastic set temperature of the nonwoven polymer web 12. By the term plastic set temperature as it is used herein is meant that temperature below which an applied stress will not cause substantial permanent deformation to the nonwoven polymer web 12, and above which the nonwoven polymer web 12 is capable of being at lease partially melted, and formed by virtue of the flow of the nonwoven polymer web 12 around at least a portion of the filaments of the glass fibers 16. Thus, the glass fibers 16 are encapsulated and adhered to the nonwoven polymer web 12.

The assemblage is further compressed, to assist in the encapsulating of the glass fibers 16, by means of pinch rolls 32 and 34 which urge the belts of the belt press toward one another. Thus, the glass fibers 16 are encapsulated in the nonwoven polymer web 12, to form a glass-fiber-containing nonwoven polymer web 36.

Conveniently, the glass-fiber-containing nonwoven polymer web 36 is cooled by conveying same through a cooling zone 38, comprising conventional cooling means such as, for example, water cooled air blowers 40 and 42 positioned above and below the belts of the belt press. The cooled glass-fiber-containing nonwoven polymer sheet 36 is then wound onto a take-up roll 44.

Figure 2:
FIG. 2 is a side elevation view of a glass-fiber-containing nonwoven polymer web, according to the present invention.

FIG. 2 illustrates the features of the glass-fiber-containing nonwoven polymer web 36, including the glass fibers 16 encapsulated in the nonwoven polymer web 12.

Figure 3:
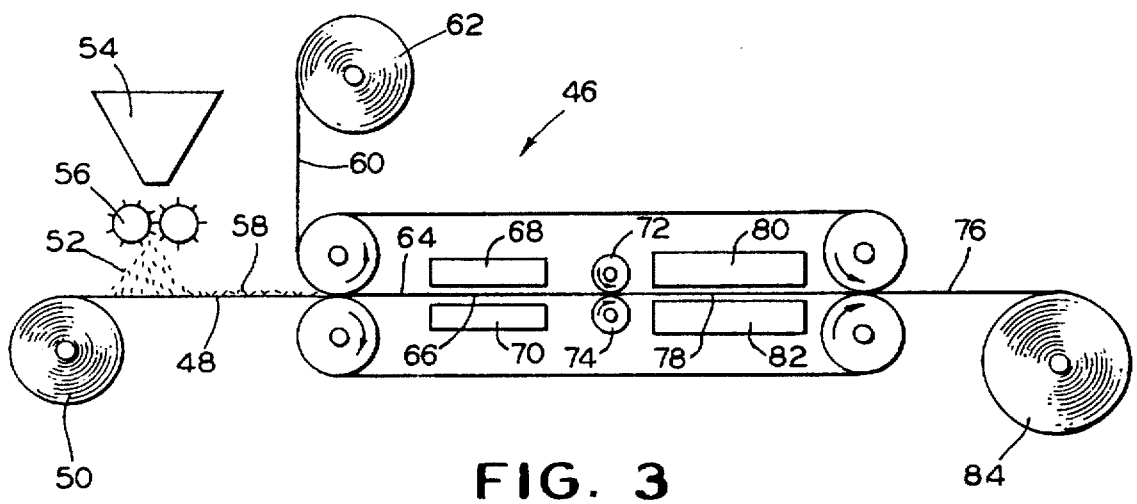
FIG. 3 is a schematic representation of an alternative process for preparing a glass-fiber-containing nonwoven polymer web, according to the present invention.

Referring now to FIG. 3, there is shown generally at 46 a schematic representation of an alternative process for preparing a glass-fiber-containing nonwoven polymer web. A first nonwoven polymer web 48 is provided, from a first nonwoven polymer web supply roll 50, in a horizontal plane. Glass fibers 52 from a feed hopper 54 are applied at a controlled rate to a surface of the first nonwoven polymer web 48 using a flow and distribution device 56 such as a star valve. Alternatively, the glass fibers could be applied by feeding continuous strands of glass to a chopper which discharges to the surface of the first nonwoven polymer web 48. The flow and distribution device 56 is operated so as to cause a layer 58 of glass fibers, having a uniform, randomly oriented distribution, to be deposited onto the first nonwoven polymer web 48.

A second nonwoven polymer web 60 is provided from a second nonwoven polymer web supply roll 62 and superposed over the layer 58 of glass fibers applied to the first nonwoven polymer web 48. The assemblage, comprising the first nonwoven polymer web 48, the second nonwoven polymer web 60, and the layer 58 of glass fibers therebetween, is then laminated together, thereby encapsulating the glass fibers 52 into the first and second nonwoven polymer webs 48 and 60. In a preferred lamination process illustrated in FIGS. 3, the lamination operation is accomplished by means of a belt press.

During lamination and encapsulation, the assemblage is compressed in an initial compression zone 64 and heated in a heating zone 66 by conventional means such as, for example, by radiant heating elements 68 and 70 positioned above and below the belts of the press. The assemblage is heated to a temperature above the plastic set temperature of the first and second nonwoven polymer webs 48 and 60. The first and second nonwoven polymer webs 48 and 60 are molded and fused together by virtue of the flow of the polymer of the webs 48 and 60 around and through he filaments of the glass fibers 52 in the vicinity of the layer 58 of glass fibers 52.

The assemblage is further compressed, to assist in the encapsulating of the glass fibers 52 and the fusing together of the nonwoven polymer webs 48 and 60, by means of pinch rolls 72 and 74 which urge the belts of the belt press toward one another. Thus, the assemblage, comprising the first nonwoven polymer web 48, layer 58 of glass fibers 52, and second nonwoven polymer web 60, is laminated to produce the glass-fiber-containing nonwoven polymer web 76 consisting essentially of glass fibers and thermoplastic fibers, according to the present invention. The glass fibers 52 are generally positioned at the fusion zone between the nonwoven polymer webs 48 and 60 in the resultant glass-fiber-containing nonwoven polymer web 76.

Conveniently, the polymer web 76 is cooled by conveying same through a cooling zone 78, comprising conventional cooling means such as, for example, water cooled air blowers 80 and 82 positioned above and below the belts of the belt press. The cooled glass-fiber-containing nonwoven polymer web 76 is then wound onto a take-up roll 84.

Figure 4:
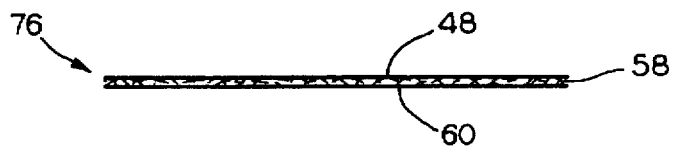
FIG. 4 is a side elevation view of an alternative embodiment of a glass-fiber-containing nonwoven polymer web, according to the present invention.

FIG. 4 illustrates the features of the glass-fiber-containing nonwoven polymer web 76, including the fused-together nonwoven polymer webs 48 and 60 and the encapsulated layer 58 of glass fibers 52 lying generally at the fusion zone therebetween.

Conveniently, the belt press may utilize any belt material which can be heated and cooled, yet will resist adhesion to the nonwoven polymer webs. Specifically, polytetrafluoroethylene (available from E. I. duPont under the trademark "TEFLON") or polytetrafluoroethylene-coated belts may be used. The belt press may be operated at any convenient rate which allows the application of a uniform, randomly oriented distribution of glass fibers, to a thickness sufficient to impart the required strength to he ultimately produced article employing the glass-fiber-containing nonwoven polymer web, according to the present invention. Typically, the belt press is operated at a speed of about 3 to about 15 meters per minute.

The nonwoven polymer webs according to the present invention may be produced from conventional thermoplastic materials which are well-known in the art of preparing laminated articles. Useful polymers from which the nonwoven polymer webs may be produced include, but are not necessarily limited to, polyamides, polyethylene, polypropylene, polycarbonates, polyurethanes, ABS resins, polyoxyalkylenes, styrenes, and the like, as well as copolymers and blends thereof. A preferred polymer for preparing the nonwoven polymer webs comprises polyethylene. It must be noted that the first and second nonwoven polymer webs may be made of the same materials, or may comprise different polymers, depending upon the characteristics desired for the finished glass-fiber-containing nonwoven polymer web. The thicknesses of the nonwoven polymer webs may vary over wide limits, but generally are within a range from about 0.8 mil to about 8 mils. A preferred thickness is about 2 mils. Nonwoven polymer webs prepared from polyethylene are generally heated to a temperature of about 450° F. during the encapsulation process. One ordinarily skilled in the art will readily recognize that other encapsulation temperatures will be required when employing nonwoven polymer webs prepared from other polymer materials.

It has been found that satisfactory results have been achieved by utilizing a polymer web material sold under the trademark SPUNFAB PA1000, for example. The SPUNFAB PA1000 product is available from D.A.T. of Akron, Ohio. The product is a high molecular weight semicrystalline polyamide copolymer.

The glass fibers are generally applied to the nonwoven polymer web at a rate so as to produce a glass-fiber-containing nonwoven polymer web product having an average glass fiber content from about 15 grams per square meter to about 250 grams per square meter. A preferred concentration, useful for preparing a glass-fiber-containing nonwoven polymer web having wide applicability, is about 70 grams per square meter. Useful glass fibers comprise bundles of filaments, each bundle containing from about 54 to about 144 ends. The glass fibers may have lengths ranging from about one-half inch to about 3 inches. A preferred glass fiber has a weight of about 110 yards per pound and an LOI value of about 2.1%. Such glass fibers are generally "sized", i.e., coated to render them more compatible with the thermoplastics of the nonwoven polymer webs.

Preparation of the glass-fiber-containing nonwoven polymer web according to the present invention conveniently does not require an adhesive. The nonwoven polymer webs encapsulate the layer of glass fibers as a result of their being heated above their plastic set temperatures and being pressed together by the nip rolls and the belts of the press. Thus, the glass-fiber-containing nonwoven polymer web comprises a convenient sheet stock, for combining with other sheet materials, for preparing laminate articles. The glass fibers are encapsulated within a supple polymer sheet which may easily be conformed to a highly irregular surface during a molding operation. Moreover, the glass fibers are substantially isolated so as to not irritate the hands of workers preparing laminate articles employing the inventive glass-fiber-containing nonwoven polymer web.

An example of the many applications for the glass fiber containing polymer sheet is its use in an automotive vehicle headliner. Two layers of the glass-fiber-containing nonwoven polymer web may be laminated or adhered to the major surfaces of a polyurethane foam board. A layer of felt or other decorative material may simultaneously or thereafter be laminated or adhered to one of the glass-fiber-containing nonwoven polymer webs, to form a laminated decorative panel. Methods and apparatus for laminating and adhering together layers of materials to form decorative panels are well-known. Such a headliner is relatively inflexible and will retain its molded shape over time due to the incorporation into the headliner of the glass fibers provided by the glass-fiber-containing nonwoven polymer webs of the present invention.

While certain representative embodiments and details have been shown for the purpose of illustrating the present invention, it will be apparent to those skilled in the art that various changes in applications can be made therein, and that the invention may be practiced otherwise than as specifically illustrated and described without departing from its spirit and scope.

What is claimed is:

1. A glass-fiber-containing nonwoven polymer web consisting essentially of glass fibers and thermoplastic fibers, comprising:

a nonwoven polymer web; and a layer of glass fibers encapsulated by the nonwoven polymer web, said glass fibers comprising bundles of filaments, each said bundle containing from about 54 to about 144 ends, said glass fibers having lengths from about one-half inch to about 3 inches, at least a portion of said nonwoven polymer web at least partially surrounding and adhering to at least a portion of the filaments of said glass fibers.

2. The glass-fiber-containing nonwoven polymer web according to claim 1, wherein the nonwoven polymer web is made from a thermoplastic selected from the group consisting of low density polyethylene, high density polyamide, polyethylene, polypropylene, polycarbonate, polyurethane, ABS resin, polyoxyalkylene, styrene, and copolymers and blends thereof.

3. The glass-fiber-containing nonwoven polymer web according to claim 1, wherein the thickness of the nonwoven polymer web ranges from about 0.5 mils to about 15 mils.

4. The glass-fiber-containing nonwoven polymer web according to claim 1, wherein the glass fiber content ranges from about 15 to about 250 grams per square meter.

5. A glass-fiber-containing nonwoven polymer web consisting essentially of glass fibers and thermoplastic fibers, comprising:

first and second nonwoven polymer webs, said nonwoven polymer webs being at least partially fused together to form a fusion zone generally therebetween; and a layer of glass fibers encapsulated substantially within the fusion zone, said glass fibers comprising bundles of filaments, each said bundle containing from about 54 to about 144 ends, said glass fibers having lengths from about one-half inch to about 3 inches.

6. The glass-fiber-containing nonwoven polymer web according to claim 5, wherein the first and second nonwoven polymer webs are made from thermoplastics selected from the group consisting of low density polyethylene, high density polyamide, polyethylene, polypropylene, polycarbonate, polyurethane, ABS resin, polyoxyalkylene, styrene, and copolymers and blends thereof.

7. The glass-fiber-containing nonwoven polymer web according to claim 5, wherein the thicknesses of the first and second nonwoven polymer webs range from about 0.5 mils to about 15 mils.

8. The glass-fiber-containing nonwoven polymer web according to claim 5, wherein the glass fiber content ranges from about 15 to about 250 grams per square meter.

9. A process for preparing a glass-fiber-containing nonwoven polymer web consisting essentially of glass fibers and thermoplastic fibers, comprising:

providing a nonwoven polymer web;

applying a layer of uniformly distributed, randomly oriented glass fibers into the nonwoven polymer web, said glass fibers comprising bundles of filaments, each said bundle containing from about 54 to about 144 ends, said glass fibers having lengths from about one-half inch to about 3 inches; and encapsulating the glass fibers, by heating said glass fibers and nonwoven polymer web to a temperature above the plastic set temperature of said nonwoven polymer web, and by compressing said glass fibers and nonwoven polymer web, said nonwoven polymer web at least partially melting and flowing around at least a portion of the filaments of said glass fibers and adhering thereto.

10. The process for preparing a glass-fiber-containing nonwoven polymer web according to claim 9, wherein the glass fibers are applied from the discharge of a chopper.

11. The process for preparing a glass-fiber-containing nonwoven polymer web according to claim 9, wherein the nonwoven polymer web comprises polyethylene.

12. The process for preparing a glass-fiber-containing nonwoven polymer web according to claim 9, wherein the compressing operation is carried out in a belt press having polytetrafluorethylene coated belts.

13. A process of preparing a glass-fiber-containing nonwoven polymer web consisting essentially of glass fibers and thermoplastic fibers, comprising:

providing a first nonwoven polymer web;

applying a layer of uniformly distributed, randomly oriented glass fibers into the first nonwoven polymer web, said glass fibers comprising bundles of filaments, each said bundle containing from about 54 to about 144 ends, said glass fibers having lengths from about one-half inch to about 3 inches;

superposing over the layer of glass fibers a second nonwoven polymer web; and encapsulating the glass fibers, by heating the first nonwoven polymer web, glass fibers, and second nonwoven polymer web to a temperature above the plastic set temperatures of the first and second nonwoven polymer webs, and by compressing the first nonwoven polymer web, glass fibers, and second nonwoven polymer web, said first and second nonwoven polymer webs at least partially fusing together and at least partially encapsulating said glass fibers therebetween.

14. The process for preparing a glass-fiber-containing nonwoven polymer web according to claim 13, wherein the glass fibers are applied from the discharge of a chopper.

15. The process for preparing a glass-fiber-containing nonwoven polymer web according to claim 13, wherein the first and second nonwoven polymer webs comprise polyethylene.

16. The process for preparing glass-fiber-containing nonwoven polymer web according to claim 13, wherein the first and second nonwoven polymer webs are different.

17. The process for preparing a glass-fiber-containing nonwoven polymer web according to claim 13, wherein the compressing operation is carried out in a belt press having polytetrafluoroethylene coated belts.

* * * * *